(12) United States Patent
Yi et al.

(10) Patent No.: US 8,170,060 B2
(45) Date of Patent: May 1, 2012

(54) METHOD OF DISCARDING DATA BLOCK IN WIRELESS COMMUNICATION SYSTEM

(75) Inventors: Seung June Yi, Anyang-si (KR); Young Dae Lee, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 12/449,053

(22) PCT Filed: Feb. 4, 2008

(86) PCT No.: PCT/KR2008/000683
§ 371 (c)(1),
(2), (4) Date: Jan. 25, 2010

(87) PCT Pub. No.: WO2008/097003
PCT Pub. Date: Aug. 14, 2008

(65) Prior Publication Data
US 2010/0136963 A1    Jun. 3, 2010

(30) Foreign Application Priority Data

Feb. 6, 2007   (KR) .................. 10-2007-0012063

(51) Int. Cl.
*H04J 3/16* (2006.01)
(52) U.S. Cl. ........ 370/471; 370/473; 370/474; 370/394; 370/395.1
(58) Field of Classification Search ............... 455/422.1; 370/235, 469, 470, 471, 473, 474
See application file for complete search history.

(56) References Cited

U.S. PATENT DOCUMENTS

| | | | |
|---|---|---|---|
| 6,700,867 B2* | 3/2004 | Classon et al. | 370/216 |
| 6,967,924 B1 | 11/2005 | Aimoto | |
| 7,286,563 B2* | 10/2007 | Chang et al. | 370/469 |
| 7,529,271 B2* | 5/2009 | Forssell | 370/469 |

FOREIGN PATENT DOCUMENTS

| | | |
|---|---|---|
| EP | 1 619 839 A1 | 1/2006 |
| WO | WO/99/48310 | 9/1999 |
| WO | WO/2005/017641 A2 | 2/2005 |
| WO | WO/2005/017641 A3 | 2/2005 |
| WO | WO 2006/104946 A1 | 10/2006 |

OTHER PUBLICATIONS

"Comparison of Different Active Queue Management Mechanisms for 3G Radio Network Controllers", Jani Lakkakorpi et al., Wireless Communications and Networking Conference, 2006. (WCNC 2006) IE EE Las Vegas, NV, USA Apr. 3-6, 2006, Piscataway, NJ, USA.

* cited by examiner

*Primary Examiner* — Temica M Beamer
(74) *Attorney, Agent, or Firm* — McKenna Long & Aldridge LLP

(57) ABSTRACT

A method of discarding data blocks in a wireless communication system is provided. The method includes configuring a radio bearer for providing a service, configuring a discard condition for a data block of the service related to the radio bearer, wherein the discard condition is configured according to a type of the data block, and discarding the data block when the data block is not successfully transmitted until the discard condition for the data block is satisfied.

12 Claims, 8 Drawing Sheets

[Fig. 1]
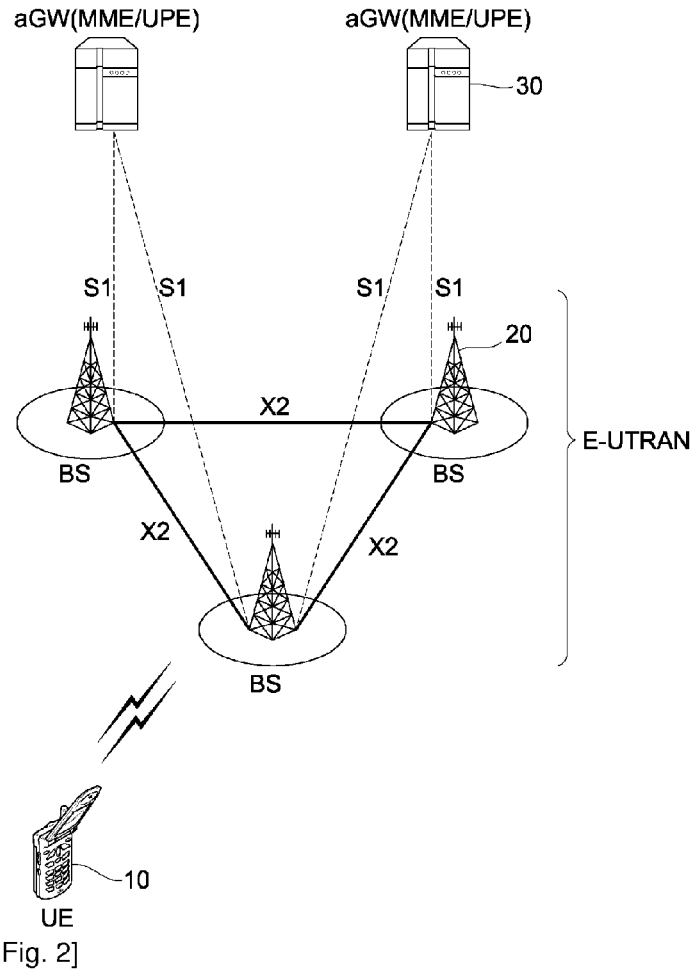
[Fig. 2]
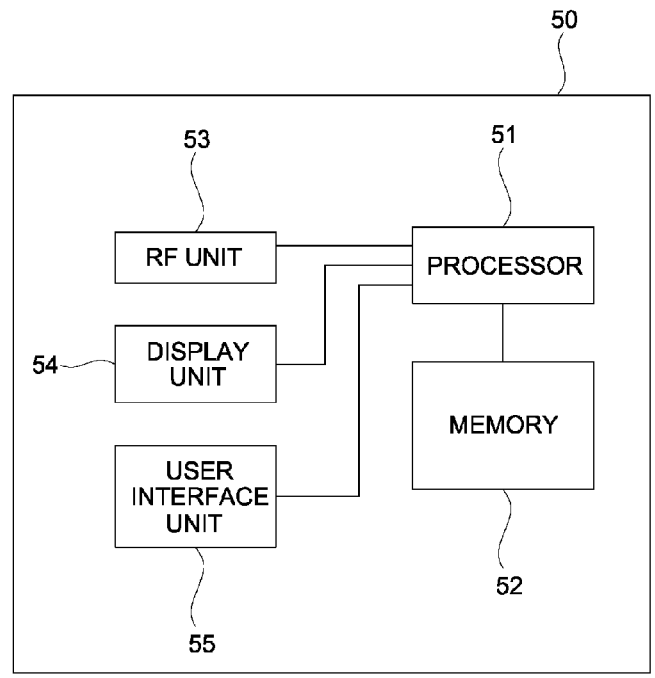

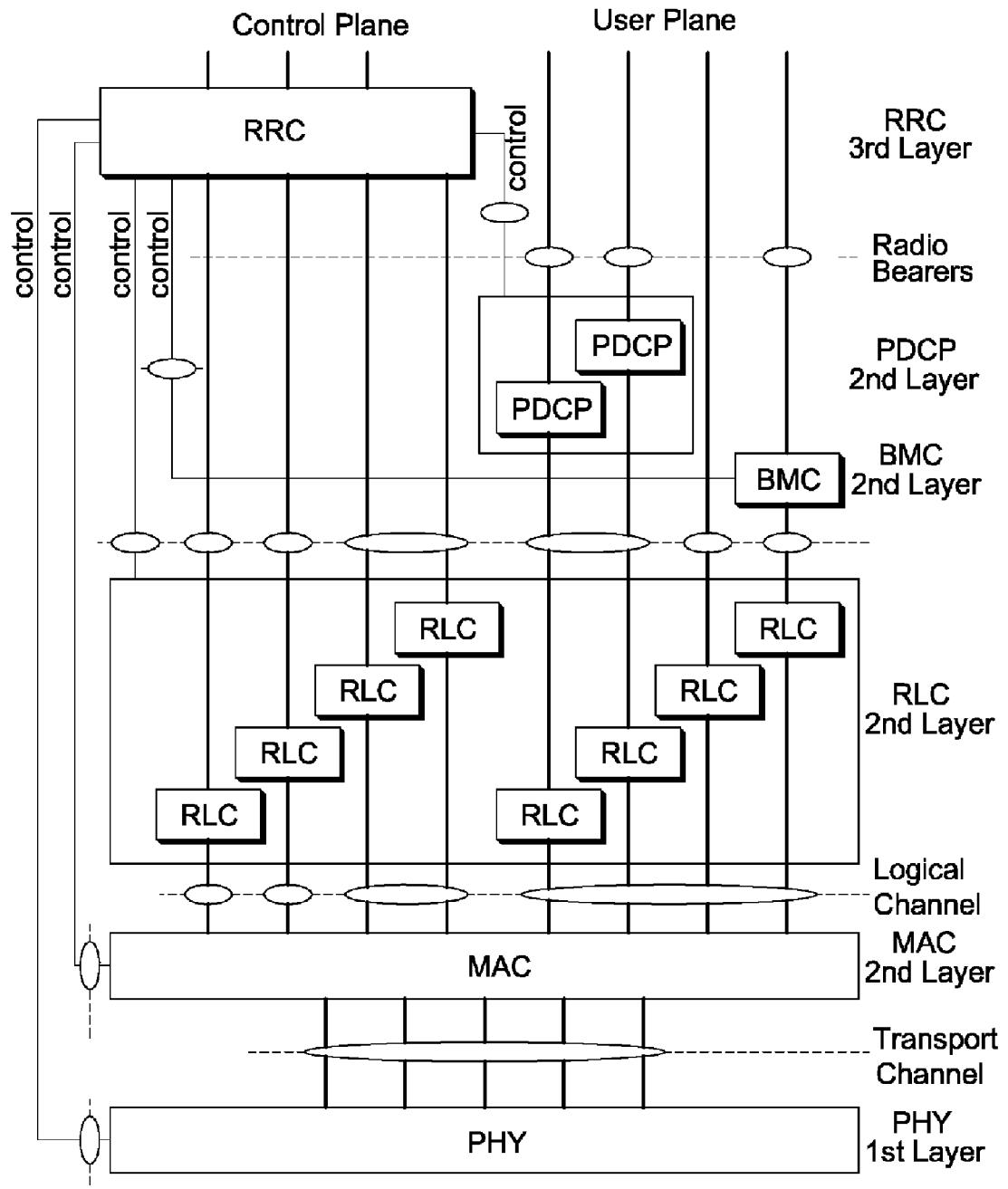
[Fig. 3]

[Fig. 4]
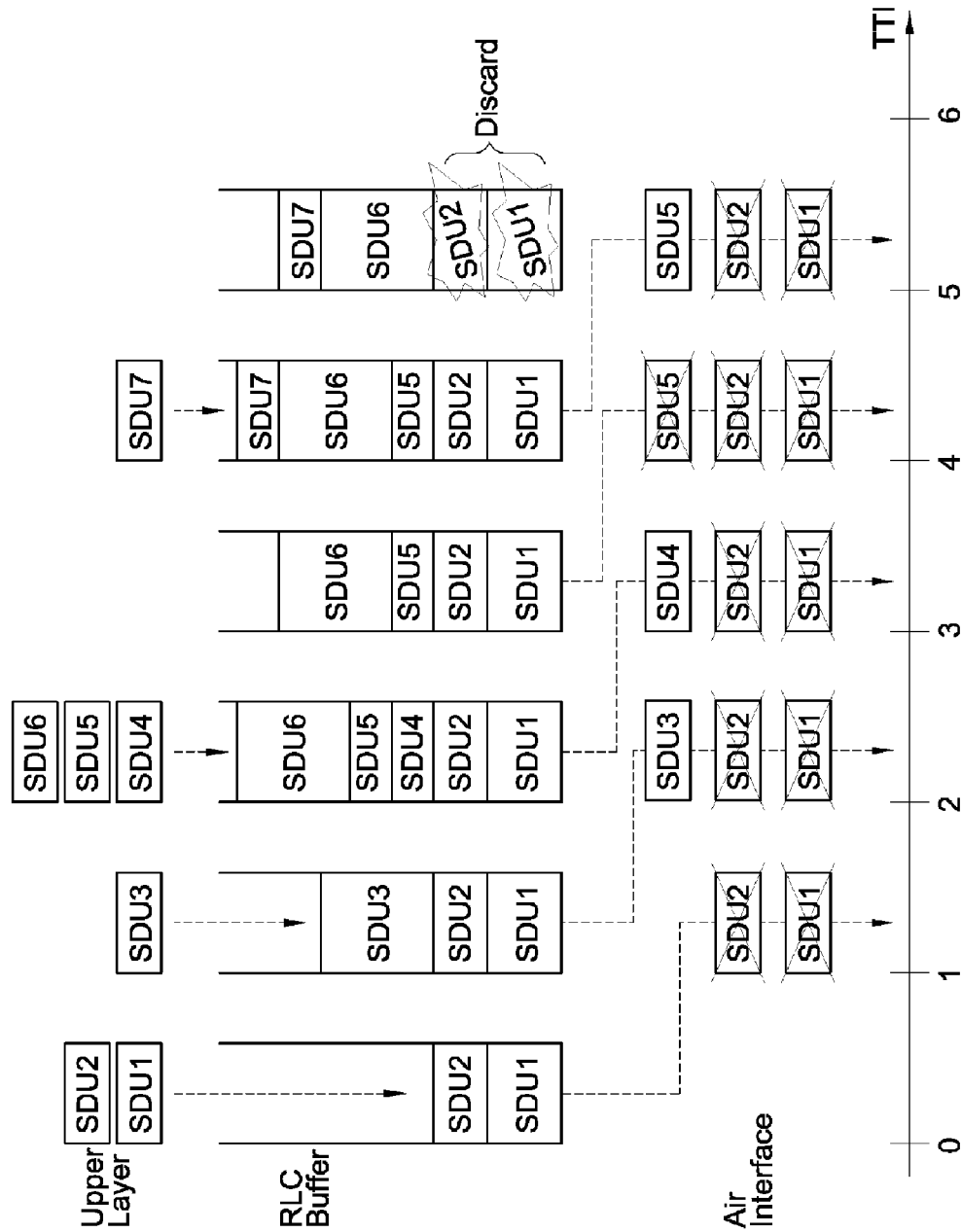
[Fig. 5]

[Fig. 6]
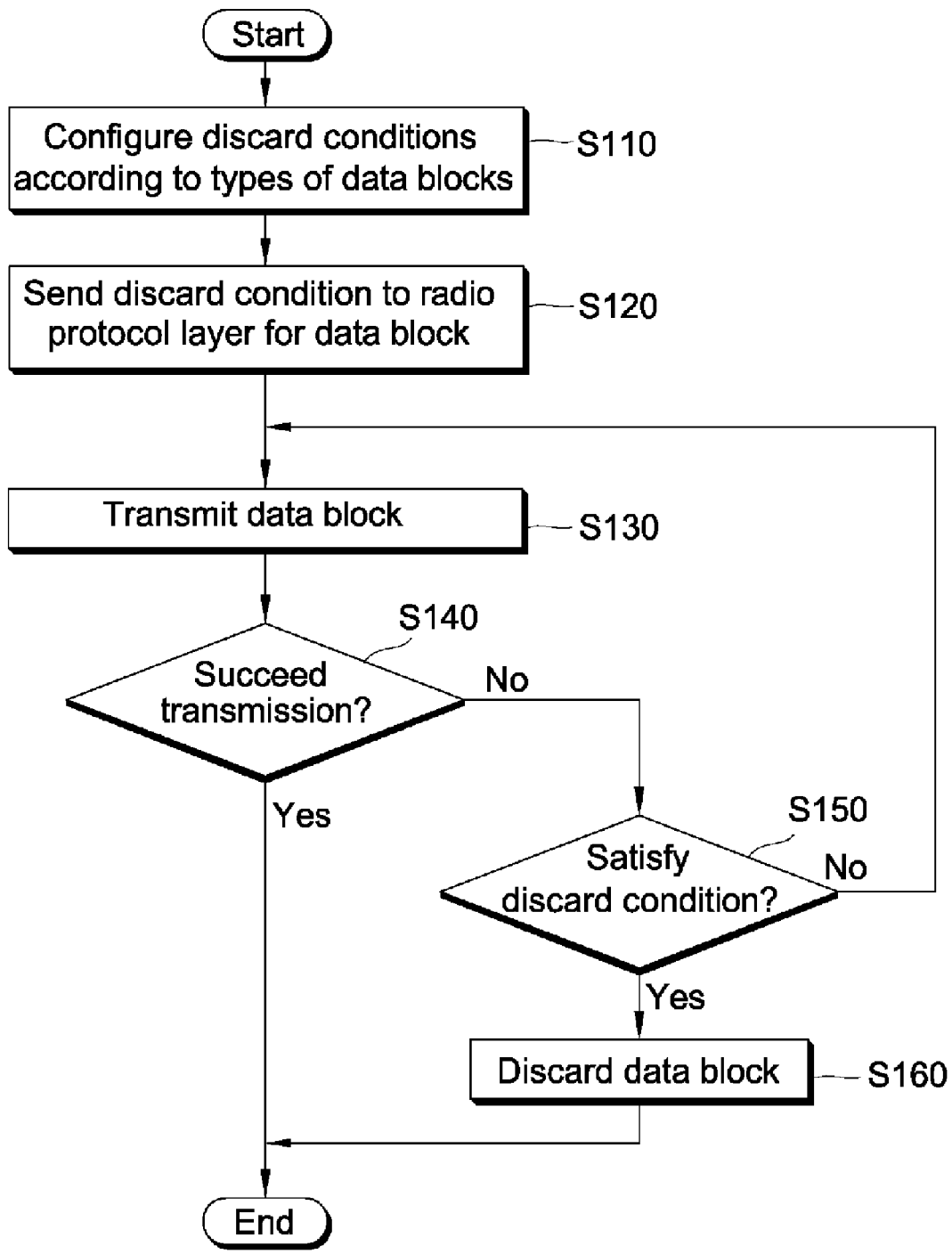

[Fig. 7]
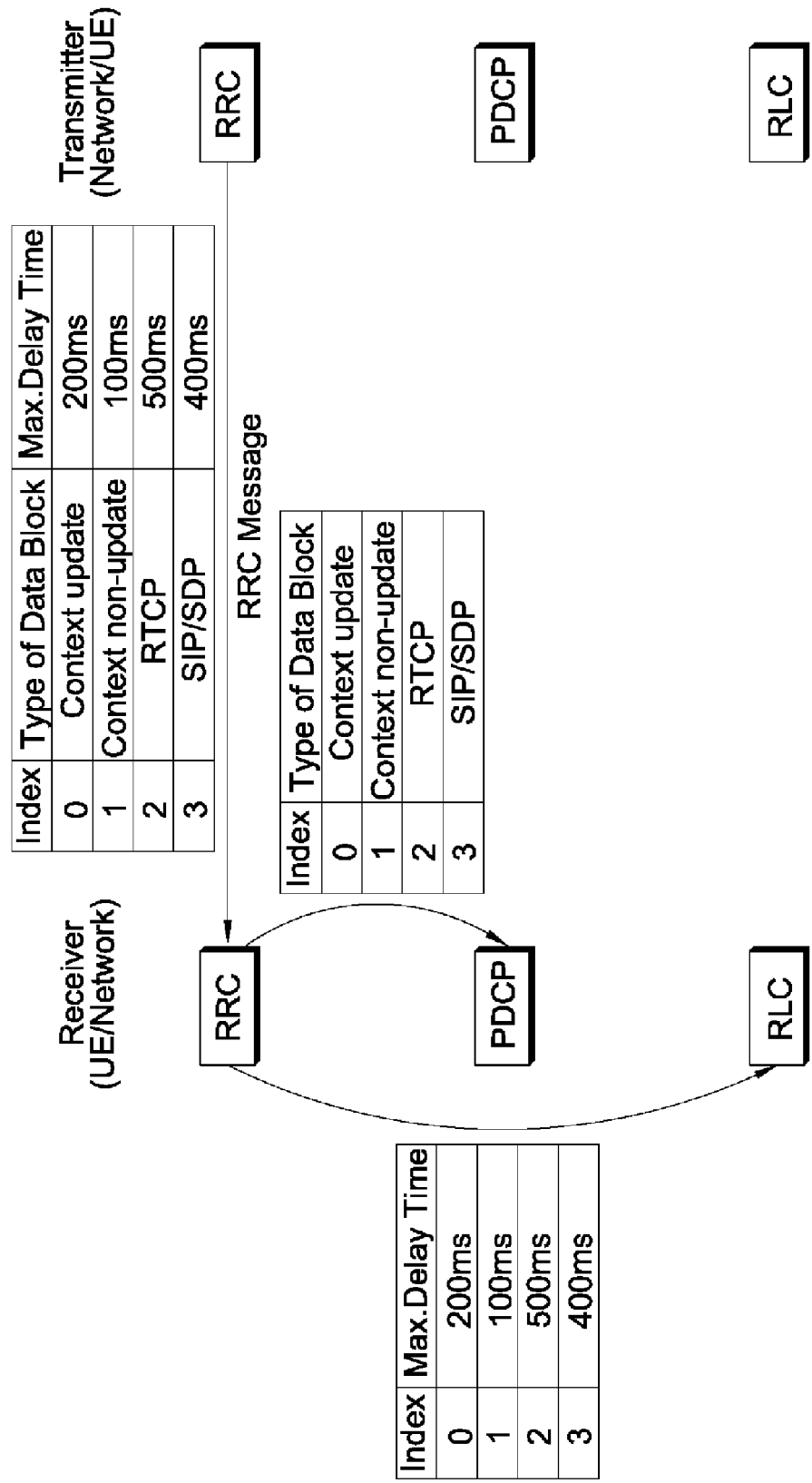

[Fig. 8]
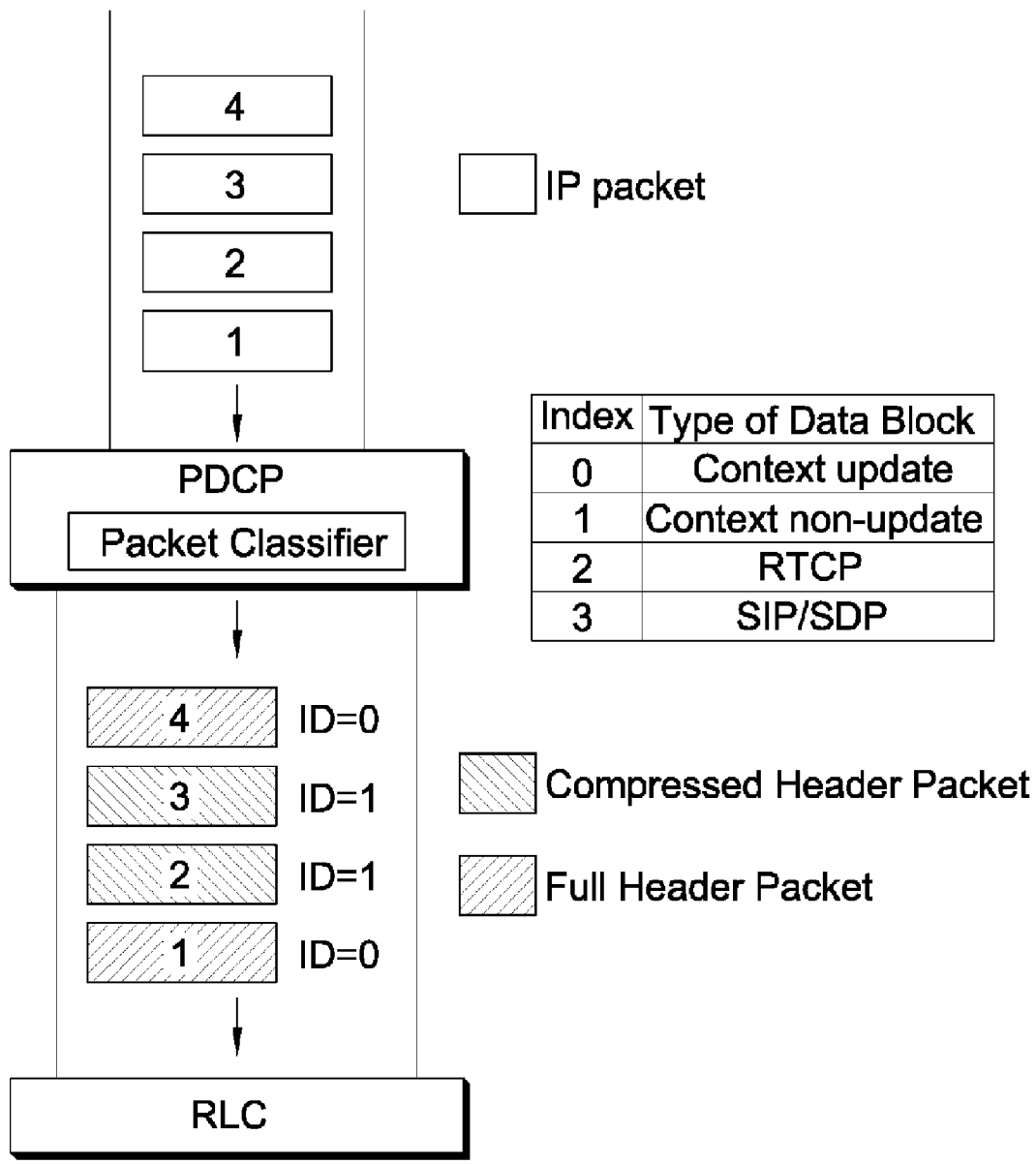

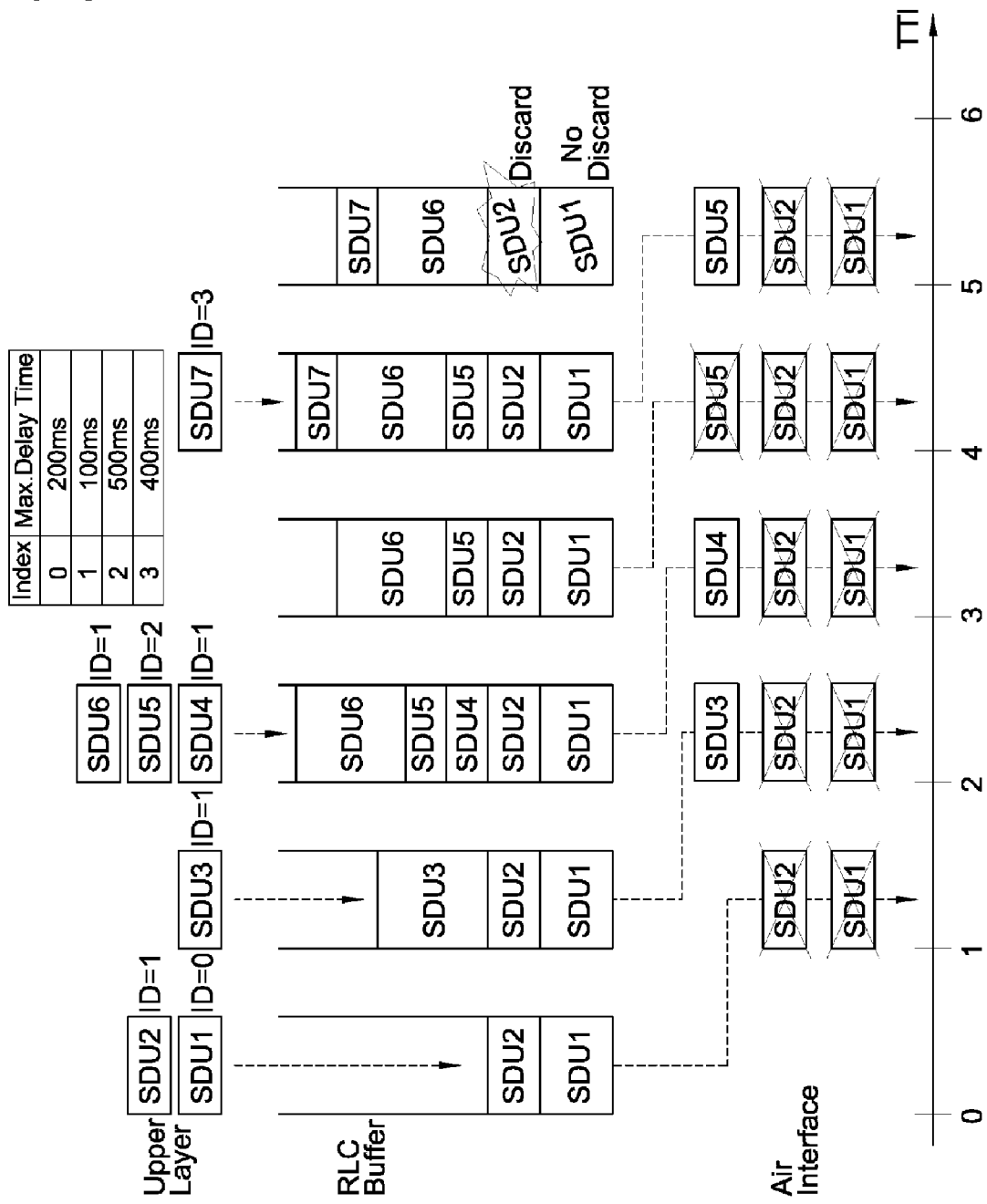
[Fig. 9]

[Fig. 10]
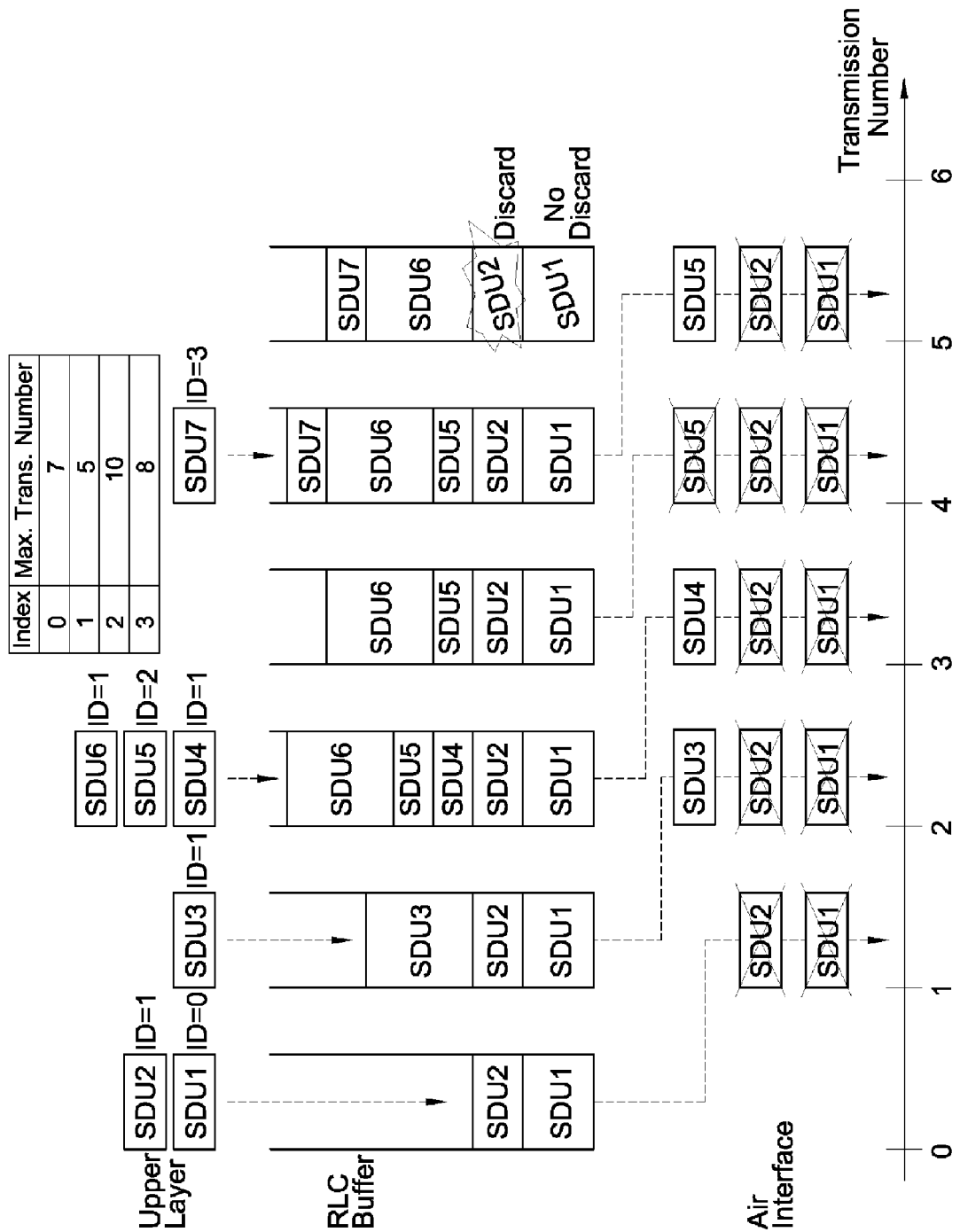

METHOD OF DISCARDING DATA BLOCK IN WIRELESS COMMUNICATION SYSTEM

This application is a 371 national stage entry of International Application No. PCT/KR2008/000683, filed Feb. 4, 2008, and Korean Patent Application No. 10-2007-0012063, filed in the Republic of Korea on Feb. 6, 2007, the contents of each of the above-identified applications is incorporated by reference herein in their entireties.

1. Technical Field

The present invention relates to wireless communication, and more particularly, to a method of enhancing the transmission efficiency of data blocks differentially according to the type of a data block in a wireless communication system.

2. Background Art

A WCDMA (Wideband Code Division Multiple Access) radio access technology-based 3GPP (3rd Generation Partnership Project) mobile communication system has been widely developed all over the world. HSDPA (High Speed Downlink Packet Access) that can be defined as the first evolution stage of WCDMA provides the 3GPP with a radio access technology having high competitiveness in the midterm future.

However, as users' and service providers' requirements and expectations are continuously increased and the development of competing wireless access technologies is in progress, there is a need for a new technology evolution in the 3GPP for future competitiveness.

In general, layers of a radio interface protocol between a user equipment and a network can be classified into L1 (a first layer), L2 (a second layer) and L3 (a third layer) on the basis of the lower three layers of the OSI (Open System Interconnection) model that is well-known to communication systems.

A data block provided to each layer for data transfer is discarded from a transmission buffer when a specific discard condition is satisfied. Each layer first stores inputted data blocks in the transmission buffer and sequentially transmits the data blocks. If transmission is failed, a corresponding data block is queued in the transmission buffer. Since the size of the transmission buffer is limited, the transmission buffer may be filled to overflowing with failed data blocks when transmission error frequently occurs. To prevent overflowing, data blocks are discarded from the transmission buffer.

Data blocks can have various types of payloads and have different priorities. Discarding a data block without considering its priority can give a bad effect on QoS (Quality of Service). When a data block with high priority is discarded, the QoS of the service for the data block may be deteriorated.

There is a need for a method of discarding data blocks differentially according to types of the data blocks to prevent overflow of the transmission buffer.

DISCLOSURE OF INVENTION

Technical Problem

A method of processing a data block in which a discard condition is applied differentially according to types of data blocks is provided.

Technical Solution

In an aspect, a method of discarding data blocks in a wireless communication system is provided. The method includes configuring a radio bearer for providing a service, configuring a discard condition for a data block of the service related to the radio bearer, wherein the discard condition is configured according to a type of the data block, and discarding the data block when the data block is not successfully transmitted until the discard condition for the data block is satisfied.

In another aspect, a method of processing data blocks in a wireless communication system is provided. The method includes receiving data blocks of a service related to a radio bearer from an upper layer, receiving discard condition information, wherein the discard condition information is configured according to types of the data blocks, transmitting the data blocks, and discarding a data block among the data blocks when the data block is not successfully transmitted and satisfies a discard condition of the data block from the configured discard condition information.

ADVANTAGEOUS EFFECTS

By applying different discard conditions to data blocks according to types of the data blocks, QoS can selectively be guaranteed according to priority of services. When a data block with high priority is successively failed to be transmitted under poor channel condition, the data block cannot be not discarded so as to guarantee the QoS for the service provided by the data block. Accordingly, an overall QoS of the system can be enhanced.

BRIEF DESCRIPTION OF THE DRAWINGS

FIG. 1 is a block diagram showing a wireless communication system.

FIG. 2 is a block diagram showing constitutional elements of a user equipment.

FIG. 3 is a view showing the structure of a radio protocol.

FIG. 4 shows an example in which data blocks are discarded according to a method based on a maximum delay time.

FIG. 5 shows an example in which a full header packet and a compressed header packet according to a header compression scheme are transmitted.

FIG. 6 is a flowchart illustrating a method of transmitting data blocks according to an embodiment of the present invention.

FIG. 7 shows an example of a method of classifying types of data blocks and a method of transmitting discard conditions.

FIG. 8 shows an example in which data blocks are transmitted from a PDCP layer to a RLC layer.

FIG. 9 shows an example of a method of allowing a RLC layer to discard SDUs differentially.

FIG. 10 shows another example of a method of allowing a RLC layer to discard SDUs differentially.

MODE FOR THE INVENTION

FIG. 1 is a block diagram showing a wireless communication system. This may be a network structure of an E-UMTS (Evolved-Universal Mobile Telecommunications System). The E-UMTS can also be referred to as a LTE (Long Term Evolution) system. The wireless communication system is widely deployed to provide a variety of communication services such as voice and packet data.

Referring to FIG. 1, an E-UTRAN (Evolved-UMTS Terrestrial Radio Access Network) includes one or more base stations (BSs) 20.

A user equipment (UE) 10 can be fixed or mobile and can also be referred to as another terminology, such as an MS (Mobile Station), UT (User Terminal), SS (Subscriber Station) or wireless device. The BS 20 generally refers to a fixed station that communicates with the UE 10 and can also be referred to as another terminology, such as an eNB (evolved-NodeB), BTS (Base Transceiver System) or access point. There are one or more cells within the coverage of one BS 20. An interface for user traffic or control traffic transmission can be used between the BSs 20. Hereinafter, downlink means a communication from the BS 20 to the UE 10, and uplink means a communication from the UE 10 to the BS 20.

The BS 20 provides the UE 10 with an end point of a user plane and a control plane. The BSs 20 can be interconnected through an X2 interface. A meshed network structure where the X2 interface always exists can be used between adjacent BSs 20.

The BS 20 is connected to an EPC (Evolved Packet Core), more particularly, an aGW (access Gateway) 30 through a S1 interface. The aGW 30 provides an end point of session and mobility management functions of the UE 10. A number of nodes (many to many) can be interconnected between the BSs 20 and the aGW 30 through the S1 interface. The aGW 30 can be divided into a part responsible for a user traffic process and a part responsible for a control traffic process. Here, an aGW for a new user traffic process can communicate with an aGW for a control traffic process using a new interface. The aGW 30 can also be referred to as a MME/UPE (Mobility Management Entity/User Plane Entity).

FIG. 2 is a block diagram showing constitutional elements of a UE. A UE 50 includes a processor 51, memory 52, a RF unit 53, a display unit 54 and a user interface unit 55. The memory 52 is coupled to the processor 51 and stores a UE operating system, applications, and general files. The display unit 54 displays a variety of information of the UE and may use a well-known element, such as an LCD (Liquid Crystal Display) or OLED (Organic Light Emitting Diode. The user interface unit 55 can be configured with a combination of well-known user interfaces such as a keypad or touch screen. The RF unit 53 is coupled to the processor 51 and transmits and/or receives radio signals.

The processor 51 implements functions of layers of a radio interface protocol are implemented. The processor 51 provides a control plane and a user plane Layers of the radio interface protocol between the UE and a network can be divided into L1 (a first layer), L2 (a second layer), and L3 (a third layer) based on the lower three layers of the OSI model that is well-known to communication systems. A PHY (physical) layer belonging to the first layer provides a service information transfer service employing a physical channel, and a radio resource control (RRC) layer belonging to the third layer functions to control radio resources between the UE and the network. The RRC layer exchanges RRC messages with the UE and the network. The RRC layer can be distributed in network nodes such as the BS 20 and the aGW 30 and can be located only in the BS 20 or the aGW 30.

FIG. 3 is a view showing the structure of a radio protocol. Layers of the radio protocol exist in pairs in a UE and a network, and take in charge of transmitting data through a radio interface.

Referring to FIG. 3, a PHY (physical) layer belonging to a first layer transmits data in a radio interface using a variety of radio transmission techniques. The PHY layer is coupled to a MAC (Medium Access Control) layer, which is an upper layer of the PHY layer, through a transport channel. The transport channel can be classified into a dedicated transport channel and a common transport channel depending on whether or not the channel is shared.

The second layer includes a MAC layer, a RLC (Radio Link Control) layer, a PDCP (Packet Data Convergence Protocol) layer, and a BMC (Broadcast/Multicast Control) layer. The MAC layer maps logical channels to transport channels. Multiple logical channels can be multiplexed to one transport channel. The MAC layer is coupled to a RLC layer (i.e. an upper layer of the MAC layer) through a logical channel. The logical channel is classified into a control channel for transmitting information on the control plane and a traffic channel for transmitting information on the user plane, depending on the type of transmitted information.

The RLC layer guarantees QoS for each radio bearer (RB) and is responsible for transmission of data accordingly. The RLC layer has one or two independent RLC entities for each RB in order to guarantee QoS unique to the RB. The RLC layer provides three RLC modes, i.e., a transparent mode (TM), an unacknowledged mode (UM), and an acknowledged mode (AM), in order to support a variety of QoSs. The RLC layer adjusts a size of data appropriate to a lower layer to transmit the data through a radio interface, and for this purpose, also performs segmentation and/or concatenation of data received from an upper layer.

The PDCP layer is located above the RLC layer and allows data, which is transmitted using packets of an IP (Internet Protocol), such as IPv4 or IPv6, to be efficiently transmitted through a radio interface of a relatively narrow bandwidth. The PDCP layer performs header compression by which the size of the header is greatly reduced so as to enhance transmission efficiency.

In the second layer, the BMC layer is placed above the RLC layer, schedules cell broadcast messages, and broadcasts the cell broadcast messages to UEs in a cell.

The RRC layer belonging to the third layer is defined only on the control plane. The RRC layer controls parameters of the first and second layers in relation with configuration, reconfiguration, and release of RBs, and controls logical channels, transport channels, and physical channels. A RB means a logical path provided by the first and second layers of the radio protocol to transfer data between the UE and the UTRAN. In general, configuring the RB means a procedure of specifying characteristics of the radio protocol layers and channels needed to provide a specific service and setting specific parameters and an operation method of each layer and channel. A RB service provided by a RB supports one QoS.

A data block (or packet) provided to each layer for transmission must be discarded when a specific discard condition is satisfied. As an example of a data block, a RLC SDU (Service Data Unit) is taken into consideration. The SDU refers to a data unit transferred from a corresponding layer to another layer. The RLC SDU refers to a data block transferred from an upper layer to the RLC layer. A transmitting-side RLC layer stores RLC SDUs, coming from an upper layer, in a transmission buffer and transmits the RLC SDUs suitably according to a radio channel condition. If a RLC SDU satisfies a discard condition, the RLC layer discards the RLC SDU in order to prevent overflow of the transmission buffer.

A discard condition for allowing a RLC layer to discard a SDU includes a method based on a maximum delay time employing a timer and a method based on a maximum transmission number. In accordance with the method based on the maximum delay time, a transmitting-side RLC layer starts a timer that measures time delayed in the RLC layer with respect to each RLC SDU or each RLC SDU segment. If a RLC SDU or a RLC SDU segment is not transmitted successfully until a maximum delay time set by the timer is reached, the RLC SDU or the RLC SDU segment is discarded. In accordance with the method based on the maximum transmission number, a transmitting-side RLC layer includes a counter that counts a transmission number in each RLC SDU or each RLC SDU segment, and increases the counter value whenever each RLC SDU or each RLC SDU segment is transmitted. If a RLC SDU or a RLC SDU segment is transmitted unsuccessfully until the counter value reaches a predetermined maximum transmission number, the RLC SDU or the RLC SDU segment, is discarded.

FIG. 4 shows an example in which data blocks are discarded according to a method based on a maximum delay time. A TTI (Transmission Time Interval) refers to a time unit in which a radio protocol processes data. Here, it is assumed that a SDU discard method based on a maximum delay time is used and the maximum delay time is 5 TTI.

Referring to FIG. 4, at TTI 0, an RLC layer receives a SDU1 and a SDU2 from an upper layer of the RLC layer and stores them in a RLC buffer. At TTI 1, the RLC layer transmits the SDU1 and SDU2, but fails in the transmission of the SDU1 and SDU2. At that time, the RLC layer receives a SDU3 from the upper layer of the RLC layer, so the SDU1 to SDU3 are stored in the RLC buffer. At TTI 2, the RLC layer retransmits the SDU1 and SDU2 and transmits the SDU3 for the first time, wherein the transmission of the SDU1 and SDU2 is unsuccessful, but the transmission of the SDU3 is successful. In the meantime, the RLC layer receives SDU4 to SDU6 from the upper layer of the RLC layer, so the SDU1, the SDU2, the SDU4 to the SDU6 are stored in the RLC buffer. At TTI 3, transmission of the SDU1 and SDU2 is unsuccessful, but transmission of the SDU4 is successful, so that the SDU1, the SDU2, the SDU5 and the SDU6 are stored in the RLC buffer. At TTI 4, retransmission of the SDU1 and SDU2 is unsuccessful and transmission of the SDU5 is also unsuccessful. The RLC layer receives a SDU7 from the upper layer of the RLC layer, so that the SDU1, the SDU2, the SDU5 to the SDU7 are stored in the RLC buffer. At TTI 5, transmission of the SDU5 is successful, but transmission of the SDU1 and the SDU 2 is unsuccessful again. At this time, the transmission of the SDU1 and SDU2 is unsuccessful up to five TTI, reaching five TTI (i.e., the maximum delay time). Thus, the SDU1 and SDU2 are unsuccessful in transmission up to the maximum delay time and therefore remain in the RLC buffer, so that the SDU1 and SDU2 are discarded.

In the case where one RB guarantees only one QoS, data that is transmitted through the same RB is guaranteed the same discard condition (a maximum delay time or a maximum transmission number). However, in some cases, data that is transmitted through one RB has different priorities depending on a method of processing the data in a radio protocol layer, so they must be guaranteed different maximum delay times or different maximum transmission numbers. One example may be a header compression method performed in the PDCP layer.

FIG. 5 shows an example in which a full header packet and a compressed header packet according to a header compression scheme are transmitted. A header compression scheme is a method employing the fact that most parts of IP packets belonging to the same packet stream are not changed. This method can reduce the overhead of IP headers by storing unchanged fields in a transmitting-side compressor and a receiving-side decompressor in the form of a context and only changed fields are transmitted after a context is formed.

Referring to FIG. 5, at an early stage of header compression, in order for the decompressor to form a context for a corresponding packet stream, the compressor transmits a full header packet. Here, there is no profit due to the header compression at this step. However, after the decompressor forms the context, the compressor can transmit only the compressed header packet and gain thereof is significant.

In order for the context of the decompressor to be always synchronized to the context of the compressor, when a context for a specific packet stream is formed for the first time, a full header packet is transmitted, and a full header packet is then transmitted once every time when a certain time period elapses while a compressed header packet is transmitted.

The compressor determines which packet is transmitted as a full header packet and which packet is transmitted as a compressed header packet with respect to a specific packet stream. If one IP packet is received from an upper layer, a compressor of a transmitting-side PDCP layer transmits a corresponding packet to the receiving-side as a full header packet or a compression header packet according to the pattern of the header. If it is determined that it is necessary to form or update a new context, the compressor transmits a corresponding packet as a full header packet. If it is determined that a context for the header pattern of a corresponding packet has already been formed in a decompressor, the compressor transmits a corresponding packet as a compressed header packet.

The decompressor of the receiving-side PDCP layer has to receive a full header packet for a specific packet stream and then form a context. This is because the context becomes a basis for decompressing compressed headers to be received later on. If the decompressor receives a compressed header packet in a state where a context is not formed, the decompressor cannot decompress an original header of a corresponding packet and therefore discards the received packet.

When the header compression scheme is used, a transmitting-side PDCP layer transmits an IP packet, which is received as one stream having the same QoS in an upper layer, as one of "a packet that forms or updates a context" (for example, a full header packet) or "a packet that does not form or update a context" (for example, a compressed header packet). However, if "a packet that forms or updates a context" is not successfully transmitted to the receiving-side, the entire "packets that do not form or update a context", which are transmitted subsequently, may not be decompressed and discarded on the receiving-side. Therefore, it can be said that to successfully transmit "a packet that forms or updates a context" is much more important than to successfully transmit "a packet that does not form or update a context".

If the same discard condition is applied to the entire data blocks transmitted through one RB, more important data cannot be transmitted differentially when compared with less important data. Accordingly, there is a need for a method of processing data according to their priorities while being guaranteed different discard conditions although the data is transmitted through one RB.

FIG. 6 is a flowchart illustrating a method of transmitting data blocks according to an embodiment of the present invention.

Referring to FIG. 6, discard conditions are configured according to types of data blocks (S110). A radio protocol layer for classifying the types of the data blocks and deciding the discard conditions according to the respective types can be a RRC layer of a network or a UE. In an embodiment, a receiving-side RRC layer can determine types of data blocks and discard conditions and transfer the decided discard conditions to a transmitting-side (a UE or network) RRC layer through a RRC message. In another embodiment, a transmitting-side RRC layer can decide types of data blocks and discard conditions and transfer decided discard conditions to a receiving-side (a UE or network) RRC layer through a RRC message.

The discard condition may be a maximum delay time or a maximum transmission number. A maximum delay time or a maximum transmission number according to a type of a data block is decided by a network or UE and is notified to a counterpart (a UE or network). In order for QoSs to be applied differentially according to types of data blocks when one RB is configured, discard conditions according to the types of the data blocks are decided by a network or UE and the decided values are notified to a counterpart (a UE or network).

There is no limit to the discrimination of types of data blocks. Types of data blocks can be classified in various ways according to systems. In an embodiment, types of data blocks can be classified into Priority1, Priority2, Priority3 and the like. In another embodiment, types of data blocks can be classified into "a packet that forms or updates a context (context update)" and "a packet that does not form or update a context (context non-update)", or "a discard-impossible packet" and "a discard-possible packet".

If the types of a data blocks and discard conditions for the types of the data blocks are received, the RRC layer of the network or UE transfers the information to the radio protocol layer through which the data blocks are transferred (S120). For example, the RRC layer can transfer the information about the types of the data blocks to the PDCP layer and transfer the discard conditions according to the types of the data blocks to the RLC layer.

The PDCP layer performs an operation for classifying the data blocks according to their types such that the RLC layer can apply the discard conditions to the data blocks differentially. Furthermore, when transferring each data block to the RLC layer, the PDCP layer can transfer information about each type of a data block to the RLC layer together with the data block. As a specific example, the PDCP layer classifies its generated data blocks into "a packet that forms or updates a context" and "a packet that does not form or update a context" according to their types and transfers information about the data blocks to the RLC layer together with the data blocks. The information about the types of the data blocks can be transferred in an index form. For example, "a packet that forms or updates a context" can be sent in a state where an index 0 is attached thereto and "a packet that does not form or update a context" can be sent in a state where an index 1 is attached thereto. If a RLC SDU is received from the PDCP layer, the RLC layer configures a discard condition accordingly on the basis of SDU type information received therewith.

The RLC layer transmits a data block (S130). If the data block is transmitted successfully, transmission of the data block is finished (S140). If the transmission of the data block is unsuccessful, the RLC layer determines whether a discard condition is satisfied (S150). If the discard condition is not satisfied, the RLC layer retransmits the data block. If the discard condition is satisfied, the RLC layer discards the data block from the RLC buffer (S160), so transmission of the data block is failed. If a data block and type information thereof are received from the PDCP layer, the RLC layer applies a discard condition to each data block according to its type. The term 'applies' refers to that if a data block is received, a discard condition is configured per on a data-block basis. If transmission of a data block is unsuccessful until a configured discard condition is satisfied (during a maximum delay time or a maximum transmission number), the data block is discarded.

If data blocks are received through one stream from an upper layer, a specific radio protocol layer applies discard conditions according to types of the data blocks differentially.

If transmission of a data block is unsuccessful until the discard condition is satisfied, the data block is discarded.

FIG. 7 shows an example of a method of classifying types of data blocks and a method of transmitting discard conditions. For clarity, data blocks are classified into four types and a discard condition employs a maximum delay time.

Referring to FIG. 7, data blocks are classified into four types such as "context update", "context non-update", "RTCP (Real-time Transport Control Protocol)", and "SIP (Session Initiation Protocol)/SDP (Session Description Protocol)". Here, the four types are only illustrative and data blocks may be classified into one or more types in various ways.

A RRC layer of a receiving-side network or UE can first decide types of data blocks and a maximum delay time according to each type, and inform a RRC layer of a transmitting-side UE or network of the results through a RRC message. At this time, the types of the data blocks can be classified using indices per on a type basis so that they can be classified easily. The index may serve as a classifier for classifying a type of a data block. Alternatively, the index may serve as a classifier for classifying a discard condition of a data block.

If the types of the data blocks and information about the maximum delay time are received, the transmitting-side UE or network transfers them to a PDCP layer and a RLC layer. At this time, the transmitting-side UE or network can provide only information necessary for each layer to the PDCP layer and the RLC layer. In other words, the transmitting-side UE or network provides the PDCP layer with an index and information about a type of a data block and the RLC layer with an index and information about a maximum delay time. Alternatively, the transmitting-side UE or network can give the entire information to the PDCP layer and the RLC layer irrespective of the layers.

Meanwhile, the RRC layer of the transmitting-side UE or network can directly decide types of data blocks and a maximum delay time according to each type. Hence, the RRC layer of the transmitting-side UE or network can inform the RRC layer of the receiving-side network or UE of the decided information through a RRC message.

FIG. 8 shows an example in which data blocks are transmitted from a PDCP layer to a RLC layer.

Referring to FIG. 8, the PDCP layer classifies data blocks according to indices for types of the data blocks provided thereto and transfers the indices to the RLC layer together with the data blocks when transmitting the data blocks. That is, the PDCP layer performs a function of the PDCP layer itself, such as a header compression function, on IP packets that are received from an upper layer of the PDCP layer without being classified, classifies the packets according to their types, and informs the RLC layer of indices (i.e., classification information) together with the packets when transferring the packets to the RLC layer. The classification information can be a predetermined classifier, and a packet type can be informed or a discard condition of a packet can be informed.

For example, in the case where the PDCP layer has processed a first packet of four IP packets, which have been sequentially received thereto, in the form of a full header packet, second and third packets thereof in the form of a compressed header packet, and a fourth packet in the form of a full header packet, the PDCP layer can send the first to fourth packets to the RLC layer together with corresponding indices (the full header packet is ID=0 and the compressed header packet is ID=1).

FIG. 9 shows an example of a method of allowing a RLC layer to discard SDUs differentially. The RLC layer receives an index (ID) (i.e., a type classifier) of each SDU together when receiving the SDU from the PDCP layer (i.e., an upper layer of the RLC layer) and applies a discard condition, according to its type, to each SDU. Here, the discard condition is a maximum delay time, TTI=20 ms.

Referring to FIG. 9, at TTI 0, a RLC layer receives a SDU1 and a SDU2 from an upper layer of the RLC layer and stores them in a RLC buffer. Since the SDU1 has ID=0, a maximum delay time of the SDU1 is 200 ms, and since the SDU2 has ID=1, a maximum delay time of the SDU2 is 100 ms.

At TTI 1, transmission of the SDU1 and SDU2 is unsuccessful, and the RLC layer receives a SDU3 from an upper layer of the RLC layer, so the SDU1 to SDU3 are stored in the RLC buffer. Since the SDU3 has ID=1, a maximum delay time of the SDU2 is 100 ms.

At TTI 2, the RLC layer retransmits the SDU1 and SDU2 and transmits the SDU3 for the first time. The transmission of the SDU1 and SDU2 is unsuccessful, but the transmission of the SDU3 is successful. In the meantime, the RLC layer receives SDU4 to SDU6 from an upper layer of the RLC layer, so the SDU1, SDU2, and SDU4 to SDU6 are stored in the RLC buffer. Since the SDU4 has ID=1, a maximum delay time of the SDU4 is 100 ms, since the SDU5 has ID=2, a maximum delay time of the SDU5 is 500 ms, and since the SDU6 has ID=1, a maximum delay time of the SDU6 is 100 ms.

At TTI 3, the RLC layer retransmits the SDU1 and SDU2, but fails, and successfully transmits the SDU4, so that the SDU1, SDU2, SDU5 and SDU6 are stored in the RLC buffer.

At TTI 4, the RLC layer fails in retransmission of the SDU1 and SDU2 and also transmission of the SDU5. The RLC layer receives a SDU7 from an upper layer of the RLC layer, so that the SDU1, SDU2, and SDU5 to SDU7 are stored in the RLC buffer. Since the SDU7 has ID=3, a maximum delay time of the SDU7 is 400 ms.

At TTI 5, the RLC layer succeeds in transmission of the SDU5, but fails in transmission of the SDU1 and SDU 2. Hence, transmission of the SDU1 has failed up to five TTI, but is not discarded since the SDU1 has the maximum delay time of 200 ms and a discard condition thereof has not yet been satisfied. Thus, the SDU1 keeps stored in the buffer and retransmission of the SDU1 is attempted. However, the SDU2 is discarded because it has the maximum delay time of 100 ms and a discard condition thereof has been satisfied at TTI 5. Accordingly, it can be seen that the SDU1, which can be considered as more important data, is not discarded, but only the SDU2, which is considered as less important data, is discarded.

FIG. 10 shows another example of a method of allowing a RLC layer to discard SDUs differentially. The RLC layer receives an index (ID) (i.e., a type classifier) of each SDU together when receiving the SDUs from the PDCP layer (i.e., an upper layer of the RLC layer) and applies a discard condition, according to its type, to each SDU. Here, the discard condition is a maximum transmission number.

Referring to FIG. 10, at transmission number 0, the RLC layer receives a SDU1 and a SDU2 from an upper layer of the RLC layer and stores them in a transmission buffer. Since the SDU1 has ID=0, the maximum transmission number of the SDU1 is 7, and since the SDU2 has ID=1, the maximum transmission number of the SDU2 is 5.

At transmission number 1, transmission of the SDU1 and SDU2 is unsuccessful and the RLC layer receives a SDU3 from an upper layer of the RLC layer, so the SDU1 to SDU3 are stored in the RLC buffer. Since the SDU3 has ID=1, the maximum transmission number of the SDU2 is 5.

At transmission number 2, the RLC layer retransmits the SDU1 and SDU2 and transmits the SDU3 for the first time. The transmission of the SDU1 and SDU2 is unsuccessful, but the transmission of the SDU3 is successful. In the meantime, the RLC layer receives SDU4 to SDU6 from an upper layer of the RLC layer, so the SDU1, SDU2, and SDU4 to SDU6 are stored in the RLC buffer. Since the SDU4 has ID=1, the maximum transmission number of the SDU4 is 5, since the SDU5 has ID=2, the maximum transmission number of the SDU5 is 10, and since the SDU6 has ID=1, the maximum transmission number of the SDU6 is 5.

At transmission number 3, the RLC layer retransmits the SDU1 and SDU2, but fails, and successfully transmits the SDU4, so that the SDU1, SDU2, SDU5 and SDU6 are stored in the RLC buffer.

At transmission number 4, the RLC layer fails in retransmission of the SDU1 and SDU2 and also transmission of the SDU5. The RLC layer receives a SDU7 from an upper layer of the RLC layer, so that the SDU1, SDU2, and SDU5 to SDU7 are stored in the RLC buffer. Since the SDU7 has ID=3, the maximum transmission number of the SDU7 is 8.

At transmission number 5, the RLC layer succeeds in transmission of the SDU5, but fails in transmission of the SDU1 and SDU 2. Hence, transmission of the SDU1 has failed five times, but is not discarded since the SDU1 has the maximum transmission number of 7 and a discard condition thereof has not yet been satisfied. Thus, the SDU1 keeps stored in the buffer and retransmission of the SDU1 is attempted. However, the SDU2 is discarded because it has the maximum transmission number of 5 and a discard condition thereof has been satisfied at the maximum transmission number 5. Accordingly, it can be seen that the SDU1, which can be considered as more important data, is not discarded, but only the SDU2, which is considered as less important data, is discarded.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of discarding data blocks performed by a transmitter in a wireless communication system, the transmitter implementing a radio interface protocol which comprises a radio resource control (RRC) layer, a radio link control (RLC), layer and a packet data convergence protocol (PDCP) layer, the method comprising:

configuring, at the RRC layer, a radio bearer for providing a service;

receiving, at the RLC layer, an index, the index indicating a type of a data block related to the service;

configuring, at the RRC layer, a discard condition for the data block according to the type indicated by the index, wherein the discard condition is differently configured for each type of data block;

transmitting, at the RLC layer, the data block to a receiver;

determining, at the RLC layer, whether the discard condition for the data block is satisfied if the data block is not successfully transmitted; and retransmitting, at the RLC layer, the data block to the receiver if the discard condition is not satisfied, or discarding, at the RLC layer, the data block if the discard condition for the data block is satisfied.

2. The method of claim 1, wherein the discard condition is a maximum delay time.

3. The method of claim 1, wherein the discard condition is a maximum transmission number of the data block.

4. The method of claim 1, wherein the type of the data block is a full header packet type or a compressed header packet type.

5. The method of claim 1, wherein the type of the data block is one of a RTCP (Real-time Transport Control Protocol) type, SIP (Session Initiation Protocol) type and SDP (Session Description Protocol) type.

6. The method of claim 1, wherein the discard condition is transmitted using a downlink message.

7. The method of claim 6, wherein the downlink message is a Radio Resource Control (RRC) message.

8. The method of claim 1, wherein the index is received from the RRC layer of the transmitter.

9. The method of claim 1, wherein the index is received from the RRC layer of the receiver.

10. The method of claim 1, wherein the data block is RLC service data units (SDUs).

11. The method of claim 1, wherein the type of the data block is a low priority type or a high priority type.

12. A transmitter in a wireless communication system, the transmitter comprising:

a radio frequency (RF) unit for transmitting or receiving a radio signal; and a processor, coupled to the RF unit and implementing a radio interface protocol which comprises a radio resource control (RRC) layer, a radio link control (RLC) layer, and a packet data convergence protocol (PDCP) layer, and configured for:

configuring, at the RRC layer, a radio bearer for providing a service;

receiving, at the RLC layer, an index, the index indicating a type of a data block related to the service;

configuring, at the RRC layer, a discard condition for the data block according to the type indicated by the index, wherein the discard condition is differently configured for each type of data block;

transmitting, at the RLC layer, the data block to a receiver;

determining, at the RLC layer, whether the discard condition for the data block is satisfied if the data block is not successfully transmitted; and retransmitting, at the RLC layer, the data block to the receiver if the discard condition is not satisfied, or discarding, at the RLC layer, the data block if the discard condition for the data block is satisfied.

\* \* \* \* \*